F. W. BAUMHOVER.
DEVICE FOR PROTECTING SHIPS.
APPLICATION FILED JAN. 22, 1917.
1,240,007. Patented Sept. 11, 1917.
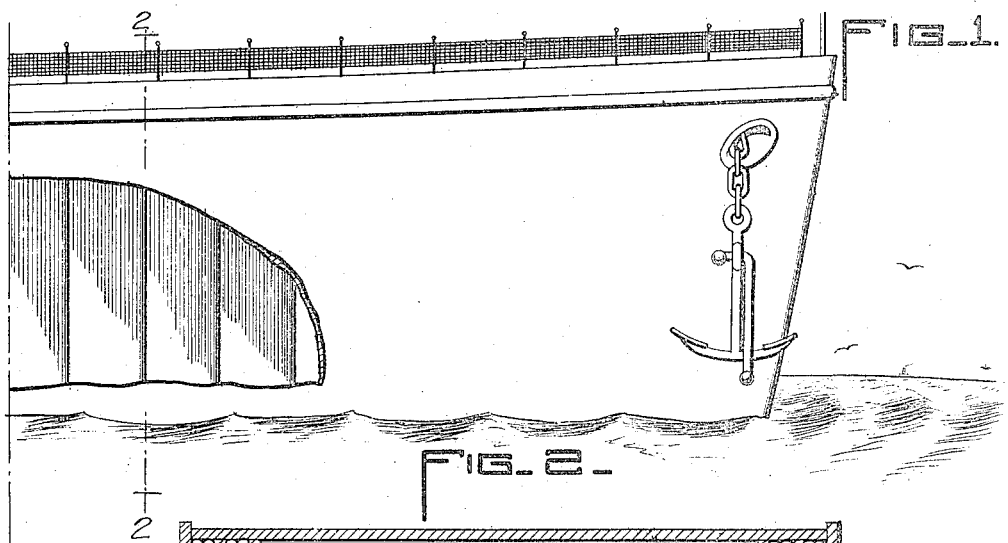
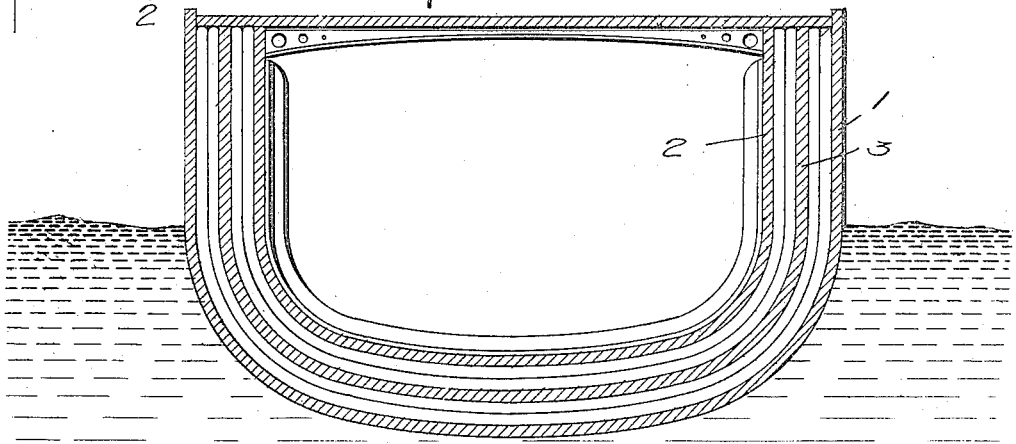
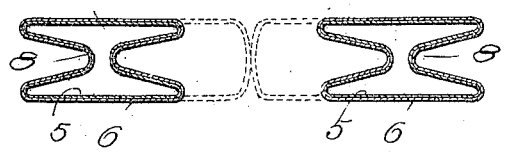
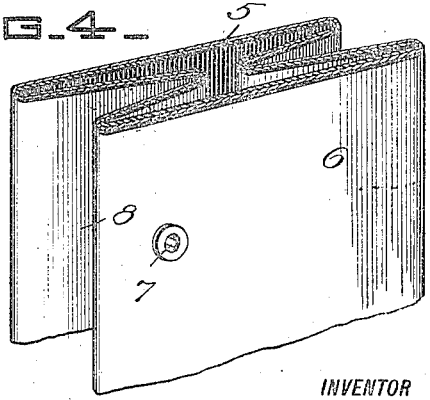
WITNESSES
INVENTOR
FRANK W. BAUMHOVER,
BY
ATTORNEYS

UNITED STATES PATENT OFFICE.

FRANK WILLIAM BAUMHOVER, OF CARROLL, IOWA.

DEVICE FOR PROTECTING SHIPS.

1,240,007.  Specification of Letters Patent.  Patented Sept. 11, 1917.

Application filed January 22, 1917. Serial No. 143,646.

*To all whom it may concern:*

Be it known that I, FRANK W. BAUM-HOVER, a citizen of the United States, and a resident of Carroll, in the county of Carroll and State of Iowa, have made certain new and useful Improvements in Devices for Protecting Ships, of which the following is a specification.

My invention is an improvement in devices for protecting ships, and has for its object to provide means for use in connection with vessels of every character, for automatically sealing a break in the wall of the vessel, to prevent the entrance of water and to keep the vessel afloat.

In the drawing—

Figure 1 is a side view of the vessel constructed in accordance with the invention and with parts broken away.

Fig. 2 is a section on line 2—2 of Fig. 1.

Fig. 3 is a section through a pair of the sealing tubes, and

Fig. 4 is a perspective view of the same.

In the present embodiment of the invention the wall of the ship is composed of an outer wall 1, an inner wall 2, and an intermediate wall 3, the said walls being spaced apart from each other and connected in the usual or any desired manner. The space between the walls 1 and 3 and between the walls 2 and 3 is filled with the devices shown in Figs. 3 and 4, that is with casings inflated and capable of expansion, so that they may fill and seal an opening in the vessel wall.

Each of these devices consists of an inner tube 5, and an outer casing 6, of rubber or the like. Each of the containers is provided with a valve 7 for permitting the container to be filled with air under pressure, and it will be noticed from inspection of Figs. 3 and 4 that each container while substantially rectangular in cross section is provided with a deep reëntrant portion 8 at each side. These reëntrant portions extend almost to the center of the container, and it will be obvious that should for instance, a container become broken, the expansion of adjacent containers will fill up the space formerly occupied by the container or casing.

It will be noticed from an inspection of Fig. 2, that the casings are arranged between the walls, each casing being of a length to extend in the present instance from the top of the wall at one side of the ship, downwardly to the bottom of the vessel and beneath the same, and to the top of the wall at the other side. It is obvious, however, that the containers might be arranged in any usual or desired manner according to conditions. The casings are arranged in abutting relation at their edges, and since the pressure in the casing is greater than that of the water, they will tend to fill a break in the vessel wall to seal the same and to prevent the entrance of water.

The inner tube 5 is elastic, as for instance of rubber or the like, and the outer casing 6 may have layers of canvas inserted therein to provide a flexible, nonelastic casing or container. The tubes are arranged in proper position before being filled with air, and each tube in practice should be about three to four feet wide, and from one to two feet thick. The thickness, however, will depend upon the distance between the walls, it being intended that as a rule one layer of tubes should be inserted between each pair of adjacent walls.

It will be understood that the walls of the vessel are braced apart in the usual manner, the braces extending between adjacent tubes.

I claim:

1. In a vessel consisting of inner, outer and intermediate walls spaced apart from each other, of flexible containers for air under pressure arranged within the spaces between the walls in abutting relation at their side edges and filling the space between the walls, each of the said casings consisting of a flexible outer casing and an elastic inner casing, and having on opposite sides reëntrant portions for the purpose specified.

2. In a vessel having spaced inner and outer walls, a series of containers for fluid under pressure arranged within the space between the walls in abutting relation, and filling the said space, each of the said containers comprising a flexible outer casing and an elastic inner casing, and having reëntrant portions at opposite sides.

3. In a vessel having spaced inner and outer walls, a series of flexible containers for fluid under pressure arranged within the space between the walls and larger than necessary to fill the said space, so that some of the containers will be provided with folds and capable of further expansion.

4. A method of protecting vessels from injury, which consists in interposing between the walls thereof flexible containers for fluid under pressure and larger than necessary to fill the said space, so that some or all of the containers will be provided with folds and be capable of further expansion.

FRANK WILLIAM BAUMHOVER.

Witnesses:
W. I. SAUL,
W. C. SAUL.

Copies of this patent may be obtained for five cents each, by addressing the "Commissioner of Patents, Washington, D. C."